(12) United States Patent
Carpenter

(10) Patent No.: US 9,791,636 B1
(45) Date of Patent: Oct. 17, 2017

(54) FIBER OPTIC FERRULE COUPLING SYSTEM

(71) Applicant: Excelitas Technologies Corp., Waltham, MA (US)

(72) Inventor: Scott Carpenter, Elgin, IL (US)

(73) Assignee: Excelitas Technologies Corp., Waltham, MA (US)

( * ) Notice: Subject to any disclaimer, the term of this patent is extended or adjusted under 35 U.S.C. 154(b) by 0 days.

(21) Appl. No.: 15/192,184

(22) Filed: Jun. 24, 2016

(51) Int. Cl.
*G02B 6/38* (2006.01)

(52) U.S. Cl.
CPC ......... *G02B 6/3843* (2013.01); *G02B 6/3869* (2013.01); *G02B 6/3821* (2013.01)

(58) Field of Classification Search
CPC .................................................. G02B 6/3843
See application file for complete search history.

(56) References Cited

U.S. PATENT DOCUMENTS

| | | | |
|---|---|---|---|
| 4,824,202 A | 4/1989 | Auras | |
| 5,065,448 A * | 11/1991 | Ortiz, Jr. | G02B 6/4296 385/53 |
| 5,142,600 A * | 8/1992 | Ortiz, Jr. | G02B 6/3813 385/83 |
| 5,289,555 A | 2/1994 | Sanso | |
| 5,584,569 A * | 12/1996 | Huang | F41G 1/545 362/110 |
| 5,594,826 A * | 1/1997 | Wood | G02B 6/403 385/88 |
| 5,640,478 A | 6/1997 | Roller | |
| 6,626,582 B2 | 9/2003 | Farrar et al. | |
| 7,545,589 B2 * | 6/2009 | Alcock | G02B 6/322 359/811 |
| 2004/0252948 A1 * | 12/2004 | Alcock | G02B 6/2706 385/73 |
| 2015/0241640 A1 * | 8/2015 | Sato | G02B 6/38 385/61 |

* cited by examiner

*Primary Examiner* — Jerry Rahll
(74) *Attorney, Agent, or Firm* — Peter A. Nieves; Sheehan Phinney Bass & Green PA

(57) ABSTRACT

A fiber optic ferrule coupling system including a ferrule interface plate having a ferrule port extending therethrough and a pocket in a side of the ferrule interface plate adjacent to the ferrule port, wherein a spring element disposed in the pocket partially protrudes into the port and applies an adjustable spring force to a ferrule connector inserted in the ferrule port via a spring cover fittable within the pocket.

28 Claims, 13 Drawing Sheets

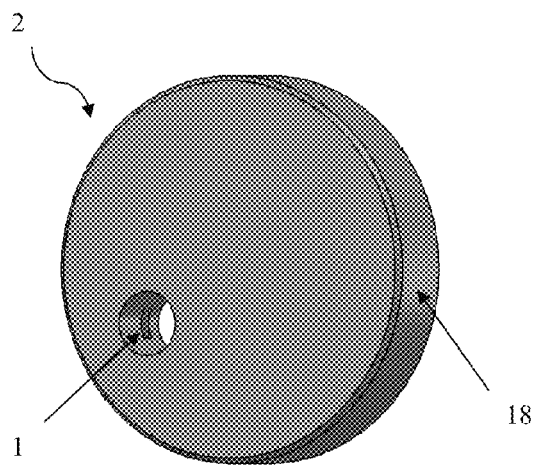
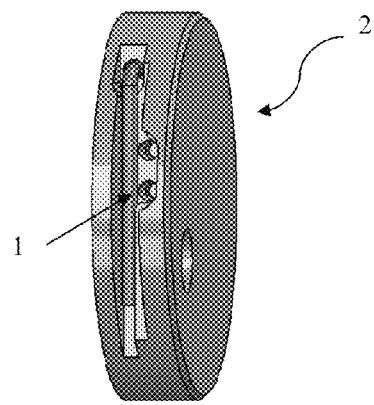
FIG. 1A  FIG. 1B
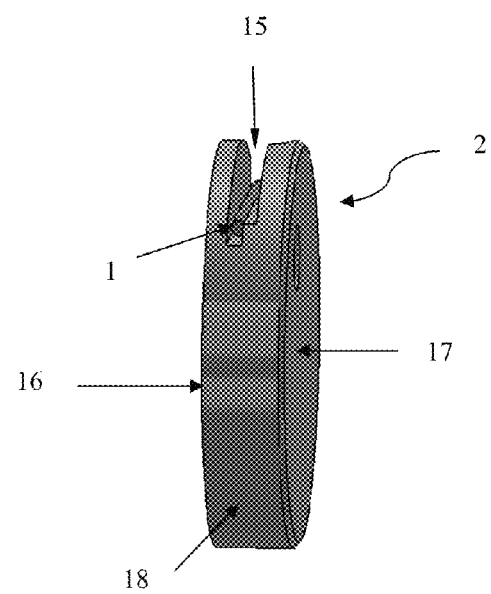
FIG. 1C

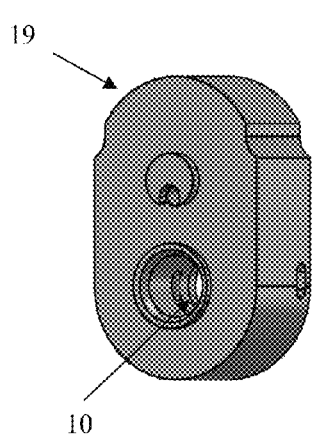
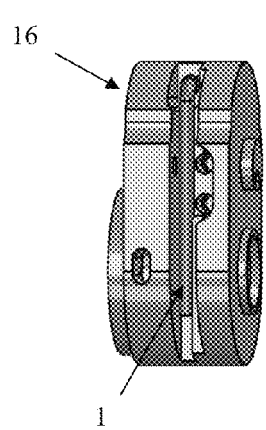
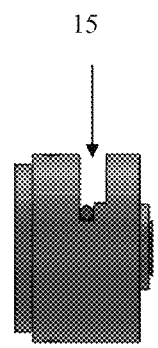
FIG. 12A    FIG. 12B    FIG. 12C
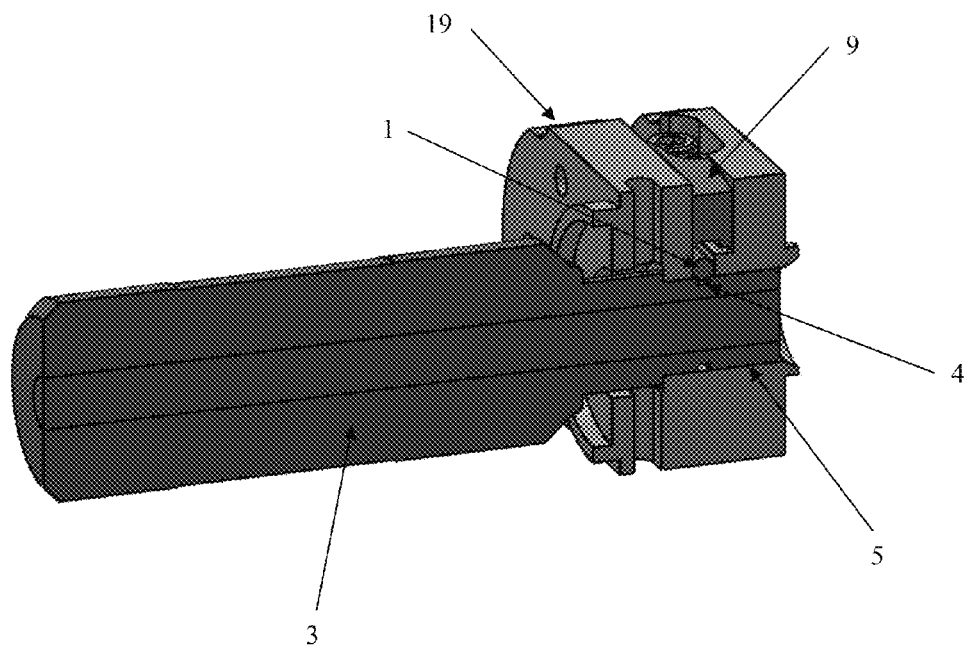
FIG. 13

FIBER OPTIC FERRULE COUPLING SYSTEM

FIELD OF THE INVENTION

The present invention relates to a fiber optic ferrule coupling system. More particularly, the present invention relates to a fiber optic ferrule coupling system that holds a ferrule connector securely within a light source housing while positioning and fixing the ends of the optical fibers at a precise location.

BACKGROUND OF THE INVENTION

Fiber optic technology, which involves the use of very thin and flexible glass or plastic fibers to transmit light, has been used in a variety of industries including communications, computer networking, and medicine.

In the medical industry, optical fibers are incorporated into imaging devices, illumination devices, laser delivery systems, sensors, and other instruments. For example, in applications where access, illumination and imaging of the internal body is required in a closed procedure (e.g., an endoscopic procedure), optical fibers can be used to provide light through instruments that are maneuverable within the body. In particular, a bundle of optical fibers (which may extend through a flexible tubular sheath to form a fiber optic cable) can be configured to transmit light from a remote light source to an endoscope or other suitable instrument. Typically, one end of the bundle is mounted within a housing containing the remote light source, while the other end is connected to the instrument.

Ferrule connectors are often used to mount the fiber optic bundle within the light source housing. Such ferrule connectors are generally elongate structures formed of glass, plastic, metal or other suitable materials, and are provided with an internal bore into which the optical fibers are inserted and held. The ferrule connector is then engaged by a mating structure of the light source housing. The mating structure may be an integral part of the light source housing, or, more often, may be provided in a single or multiple port device which is mounted inside or on an exterior portion of the light source housing. The ferrule connector is then coupled to the light source by inserting it within a port of the device, where it is engaged by a mating structure of the device.

Mating structures for engaging the ferrule connector are selected from cylindrical type spring clips, a single spring plunger, multiple spring plungers, spring loaded arms or other mechanisms, compression collets, or the like. The ferrule connector outer surface is typically provided with an external groove corresponding to the mating structure for enhanced mating. While such mating structure configurations are capable of providing a connection between the light source housing and the optical fibers, they possess drawbacks. For example, cylindrical spring clips have the ability to move within the ferrule groove. As a result, when the ferrule is engaged by a cylindrical spring clip, the ferrule is not positively fixed to the mating part but, rather, it is capable of moving axially, horizontally, vertically, and rotationally. Likewise, multiple spring plungers position the ferrule in the center of the mating part, and as a result, they allow the ferrule to move horizontally and vertically. Such motion of the optical fibers make it difficult, if not impossible, to maintain proper orientation of the optical fibers within the light source. Providing and maintaining proper orientation is important since the orientation and position of the optical fibers relative to the output of the light source directly affects how much light is transmitted from the light source into the fiber.

It would thus be desirable to provide a structure which fixes a ferrule connector within a light source housing so as to prevent movement of the ferrule in axial, horizontal, vertical, and rotational directions. It would further be desirable to provide such a structure that is capable of permanently or temporarily fixing various sizes and shapes of ferrule connectors, with or without external grooves.

SUMMARY OF THE INVENTION

Embodiments of the present invention provide an improved fiber optic ferrule coupling system. More particularly, the present invention relates to a fiber ferrule coupling system that securely holds a fiber optic ferrule within a light source housing while positioning and maintaining the ends of the optical fibers at a precise location.

According to one aspect, the present invention provides a fiber optic ferrule coupling system comprising a ferrule interface plate having opposing faces and a side surface connecting the opposing faces, a ferrule port extending through a thickness of the ferrule interface plate between the opposing faces, a pocket disposed along the side surface and extending adjacent the ferrule port, an elongate spring element disposed in the pocket, and a spring cover adjustably received in the pocket. The elongate spring element is in a position approximately parallel to a line tangent the ferrule port, and has a ferrule engaging portion along a length thereof protruding into the ferrule port for engaging a ferrule connector inserted in the ferrule port. The spring cover has a spring engaging side, the spring cover engaging side having a recess and a spring element engaging portion, the spring element engaging portion engaging a portion of the elongate spring element, wherein the spring cover is adjustably received in the pocket so as to change the location of the spring element engaging portion relative to the ferrule engaging portion of the elongate spring element.

Embodiments according to this aspect include one or more of the following features. The spring element engaging portion applies a force to the elongate spring element, which applies a force to a ferrule connector inserted in the ferrule port. Changing the location of the spring element engaging portion relative to the ferrule engaging portion of the elongate spring element adjusts the force applied by the ferrule engaging portion to a ferrule connector inserted in the ferrule port. Positioning the spring element engaging portion closer to the ferrule engaging portion of the elongate spring element increases the force applied to the ferrule connector inserted in the ferrule port, and positioning the spring element engaging portion further away from the ferrule engaging portion of the elongate spring element decreases the force applied to the ferrule connector inserted in the ferrule port. The ferrule interface plate is cylindrical with opposing circular faces and a curved surface connecting the opposing circular faces. The ferrule connector includes a groove in an outer surface, and wherein the spring element engages the groove of the ferrule connector by at least partially dropping into the groove. A diameter of the spring element is larger than a width of the groove. The spring element is a cantilevered spring. The spring element is a floating spring. The spring cover engaging side has a recess disposed between two spring element engaging portions. The spring element has a generally elongate linear shape. The spring element has a generally elongate L-shape, a generally elongate J-shape, a generally elongate U-shape, or a generally elongate linear shape with one or more curves. The fiber optic ferrule coupling system further comprises one or more additional elongate spring elements disposed in the pocket parallel to the spring element. The ferrule port has an inner generally circular surface, wherein the ferrule engaging portion of the elongate spring element engages a ferrule connector inserted in the ferrule port and pushes the ferrule connector against an opposing side of the inner generally circular surface to secure the ferrule connector.

According to another aspect, the present invention provides a fiber optic ferrule coupling system comprising a ferrule interface plate having opposing faces and a side surface connecting the opposing faces, a ferrule port extending through a thickness of the ferrule interface plate between the opposing faces, a pocket disposed along the side surface and extending adjacent the ferrule port, an elongate spring element disposed in the pocket, and a spring cover adjustably received in the pocket. The elongate spring element is in a position approximately parallel to a line tangent the ferrule port, and has a ferrule engaging portion along a length thereof protruding into the ferrule port for engaging a ferrule connector inserted in the ferrule port. The spring cover has a spring engaging side, the spring cover engaging side having a recess disposed between two spring element engaging portions, the spring element engaging portions engaging a portion of the elongate spring element, wherein the spring cover is adjustably received in the pocket so as to change the location of the recess relative to the ferrule engaging portion of the elongate spring element.

Embodiments according to this aspect include one or more of the following features. The spring element engaging portions each apply a force to the elongate spring element, which applies a force to a ferrule connector inserted in the ferrule port. Changing the location of the recess and the locations of the spring element engaging portions relative to the ferrule engaging portion of the elongate spring element adjusts the force applied by the ferrule engaging portion to a ferrule connector inserted in the ferrule port. Positioning the spring element engaging portions closer to the ferrule engaging portion of the elongate spring element increases the force applied to the ferrule connector inserted in the ferrule port, and positioning the spring element engaging portion further away from the ferrule engaging portion of the elongate spring element decreases the force applied to the ferrule connector inserted in the ferrule port.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIGS. 1A-1C illustrate a ferrule interface plate having a circular, cylindrical structure and a single cantilevered spring element disposed therein for coupling with a ferrule connector according to an embodiment of the present invention.

FIGS. 12A-12C illustrate a ferrule interface plate having an oval, cylindrical shape with a single cantilevered spring disposed therein for coupling with a ferrule connector according to an embodiment of the present invention.

FIG. 13 shows a cross sectional view of a ferrule connector inserted within the ferrule port of the ferrule interface plate of FIGS. 12A-12C according to an embodiment of the present invention.

DETAILED DESCRIPTION

Figure 2A:
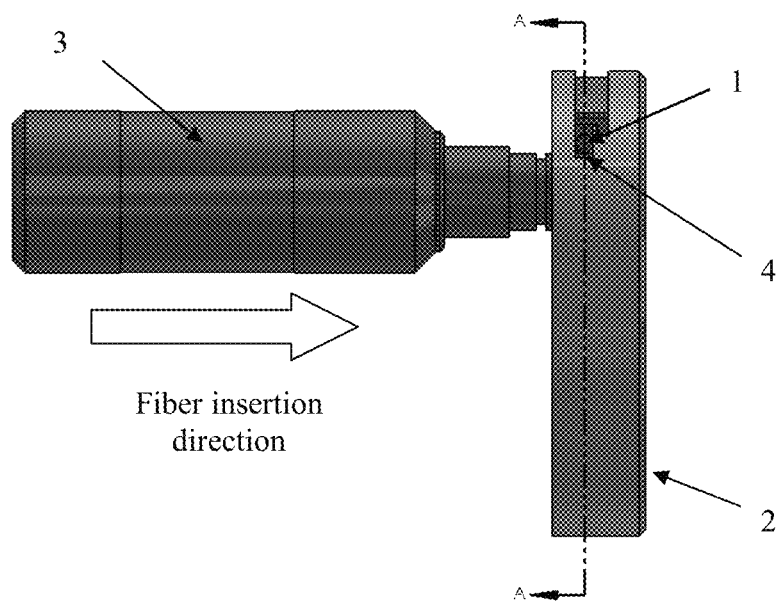
FIGS. 2A-2B illustrate insertion of a ferrule connector within a ferrule port of the ferrule interface plate of FIGS. 1A-1C according to an embodiment of the present invention.

Reference will now be made in detail to embodiments of the present invention, examples of which are illustrated in the accompanying drawings. Wherever possible, the same reference numbers are used in the drawings and the description to refer to the same or like parts.

The present invention generally provides a fiber optic ferrule coupling system configured to hold optical fibers securely in a precise position relative to an illumination source. Such fiber optic ferrule coupling systems may be provided with a single ferrule port configuration or a multiple ferrule port configuration.

Multiple ferrule port configurations allow for the use of a wider variety of sizes and shapes of ferrule connectors and, thus, a wider variety of sizes and shapes of optical fiber bundles or cables. With such multiple ferrule port configurations, only a single ferrule port is used at a given time, and the system is configured and arranged such that each of the individual ferrule ports can be positioned for use as needed.

According to some embodiments, the fiber optic ferrule coupling system is a multiple port configuration and is designed for use with a turret system or the like, which is attachable to an illumination source housing. Such turret systems are well known and, thus, the turret systems for use with the present fiber optic ferrule coupling system can be in accordance with any conventional turret system design. Generally, the turret system includes multiple ports and is rotationally mounted on or within a light source housing so that it can be incrementally rotated to each of the multiple ports. This allows a user to select a specific port for connecting the light source to a wider variety of different sized medical instruments. The present fiber optic ferrule coupling system is then disposed on or within the turret system, with ports in the present fiber optic ferrule coupling system lining up with ports in the turret system. Once the turret/fiber optic ferrule coupling system assembly is mounted on or within the light source housing, a ferrule connector can then be inserted within the desired port of the turret system and fiber optic ferrule coupling system and retained therein.

According to one embodiment of the present invention, as depicted in FIGS. 1A-4B, a fiber optic ferrule coupling system includes a ferrule interface plate 2 with a ferrule port 10 passing through, a pocket 15 in a side of the ferrule interface plate 2 adjacent the ferrule port, a spring element 1 disposed in the pocket 15 so as to partially protrude into the port 10 along a portion of its length, and a spring cover 9 fittable within the pocket 15.

As depicted in FIGS. 1A-4B, the ferrule interface plate 2 includes opposing faces 16, 17 with a connecting surface 18, and a ferrule port 10 passing through the height of the ferrule interface plate 2 from one face 16 to the other face 17. The pocket 15 is disposed along the connecting surface 18 so as to position the spring element 1 therein.

As shown in the embodiment of FIGS. 1A-4B, the ferrule interface plate 2 is in the form of a short cylindrical structure having opposing faces 16, 17 of a generally circular shape, with a curved connecting surface 18. Such a cylindrical structure with circular opposing faces 16, 17 is particularly suitable for use in multiple ferrule port configurations. In particular, multiple ferrule port configurations are typically rotationally mounted on or within an illumination source (e.g., via a turret system or the like, as discussed above) for incremental rotation to each of the multiple ferrule ports 10. By providing a generally cylindrical circular configuration, with multiple ferrule ports 10 positioned about the faces 16, 17 at uniform distances from a central mounting point of the ferrule interface plate 2, each of the multiple ferrule ports 10 can be incrementally poisoned by rotating the system. The cylindrical and circular structure may also be useful in single ferrule port configurations. However, the present ferrule interface plate is not limited to the depicted cylindrical and structure. Rather, in single ferrule port configurations, the ferrule interface plate 2 can be provided in any geometric shape and simply mounted on or within the illumination source with the ferrule port 10 properly aligned. Likewise, any variety of geometric shapes can be used in multiple ferrule port configurations provided that the multiple ferrule ports are positioned within the ferrule interface plate 2 such that manipulation of the ferrule interface plate 2 (e.g., by rotation or other types of manipulation) positions each of the multiple ferrule ports properly aligned for use.

Figure 14A:
FIGS. 14A-14E illustrate a variety of spring element configurations in accordance with embodiments of the present invention.
Figure 14B:
Figure 14C:
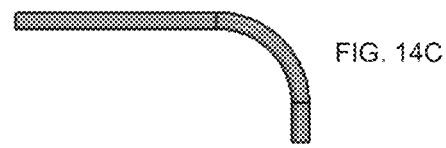
Figure 14D:
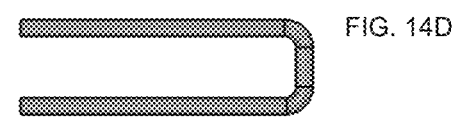
Figure 14E:

As shown, for example in FIGS. 14A-E, the spring element 1 is in the form of an elongate bar-like structure, which can be, for example, generally linear (FIG. 14A), generally L-shaped (FIG. 14B), generally J-shaped (FIG. 14C), generally U-shaped (FIG. 14D), or slightly curved in shape (FIG. 14E, with the curve being positioned anywhere along the length of the structure, and wherein one or more curves can be provided as desired). The spring element 1 is then disposed along its length within the pocket 15 such that it generally lies along what might be considered a chord of a circular cross section of the ferrule interface plate 2 (in the case of circular shaped faces 16, 17), with a portion along its length being extendable so as to protrude within the ferrule port 10. In the case of circular and non-circular shaped faces 16, 17, the spring element 1 position within the pocket 15 can be described relative to the ferrule port 2, wherein the spring element 1 is movable between a position in which it generally lies tangent to the ferrule port 2, a position in which it generally crosses the interior of the ferrule port slightly (secant), and a position in which it may be disposed above but not touching the ferrule port 2 (not quite tangent). The entire length of the spring element 1 would, thus, move from a position above the ferrule port to a position in which at least a small portion along its length protrudes into the ferrule port (somewhat secant-like).

It is noted that the shape of the spring element 1 is not particularly limited as long as it fits within the pocket 15 in the manner described above, and as long as a portion along its length is extendable to protrude within the ferrule port 10 such that that portion along its length engages a ferrule connector 3 inserted in the ferrule port 10. According to some embodiments, the spring is a cantilevered spring as shown in the embodiment of FIG. 1. The term "cantilevered spring" as used herein essentially means that the spring is supported or anchored at one end within the pocket 15 by the spring cover 9. This anchoring at one end within the spring cover would be present regardless of whether or not the ferrule connector 3 is inserted in the ferrule port 10. According to other embodiments, the spring is a floating spring, as shown in the embodiment of FIG. 7. The term "floating spring" as used herein essentially means that the spring is not anchored within the pocket 15 unless and until the ferrule connector 3 is inserted in the ferrule port 10. When the ferrule connector 3 is inserted in the ferrule port 10, the ferrule connector 3 pushes the floating spring back into the pocket 15 (i.e, in a direction out of the ferrule port 10), which then causes the floating spring to engage the spring element engaging portions 22). According to some embodiments, a plurality of springs of one or more types (e.g., cantilevered and/or floating) are used in combination.

Figure 2B:
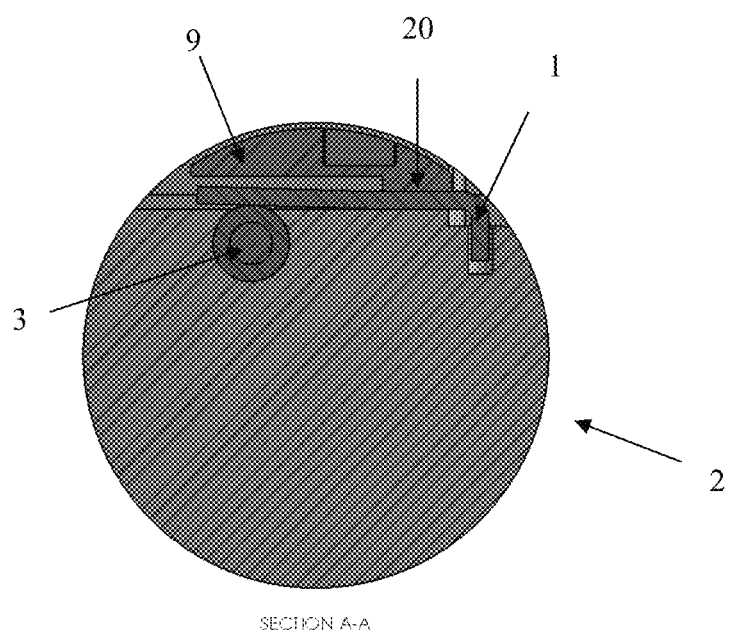

As shown in FIGS. 2A-B, the ferrule connector 3 is inserted into the ferrule port 10 of the interface plate 2. As the ferrule connector 3 reaches the location of the spring element 1, it pushes the spring element 1 upwards (i.e., to the extent that the spring element 1 protrudes into the ferrule port 10, it pushes the spring element 1 out of the ferrule port 10 and into the pocket 15, which depending on the position of the interface plate 2 and ferrule port 10, may not necessarily be in an "upward" direction but, rather, is generally in any direction that corresponds to into the pocket 15 and out of the ferrule port 10) and out of the way, see FIG. 2B. As the ferrule connector 3 continues to be inserted in the ferrule port 10, the groove 4 on the ferrule connector 3 reaches the location of the spring element 1, and the spring element 1 drops down (i.e., into the ferrule port 10, which depending on the position of the interface plate 2 and ferrule port 10, may not necessarily be in a "downward" direction but, rather, is generally in any direction that corresponds to into the ferrule port 10) and engages with the groove 4 on the ferrule connector 3. This engagement of the groove 4 of the ferrule connector 3 and the spring element 1 secures the ferrule connector 3 within the ferrule port 10, particularly by forcing the ferrule connector 3 against the opposing side 5 of the ferrule port 10 (the opposing side 5 of the ferrule port 10 being the side opposite to the engaging spring element 1). As such, the present spring element 1 is configured so as to engage the ferrule connector 3 and hold it against a fixed surface (opposing side 5), which provides more precise and stable fixing of the ferrule connector 3 within the ferrule port 10.

As shown in FIGS. 2A-4B, the spring cover 9 is positioned in the pocket over the spring element 1 so as to engage the spring element 1. The spring cover 9 is configured so as to apply force to the spring element 1, which in turn applies force to the ferrule connector 3 to thereby securely engage the ferrule connector 3 within the ferrule port 10.

Figures 4A, 4B:
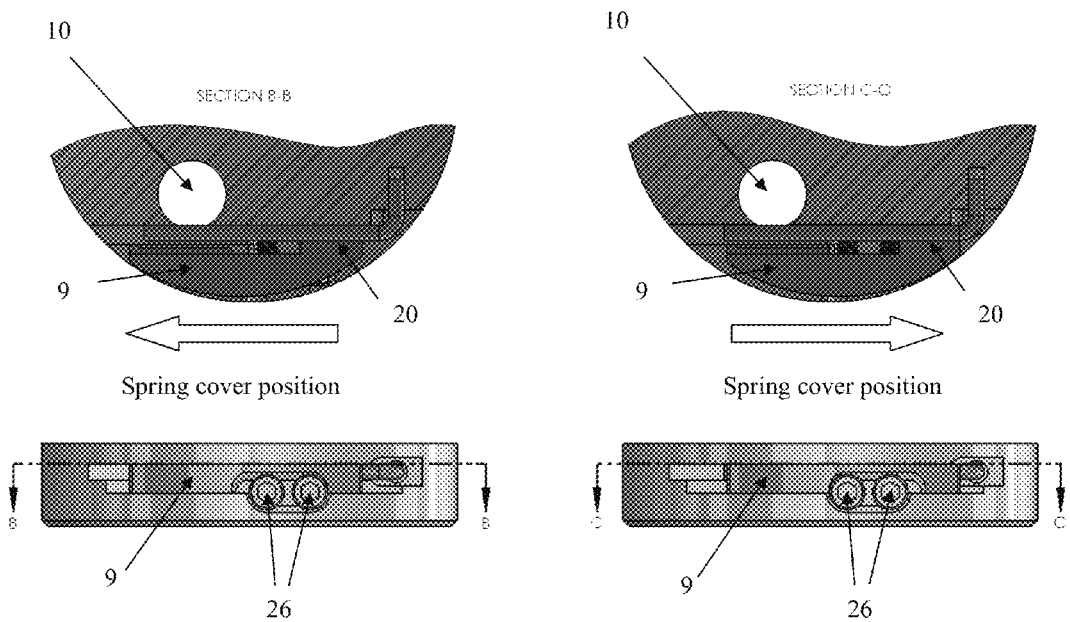
FIGS. 4A-4B illustrate how the cantilevered spring element can apply varying degrees of force to the ferrule connector by varying the positioning of a spring cover according to an embodiment of the present invention.
Figure 5A:
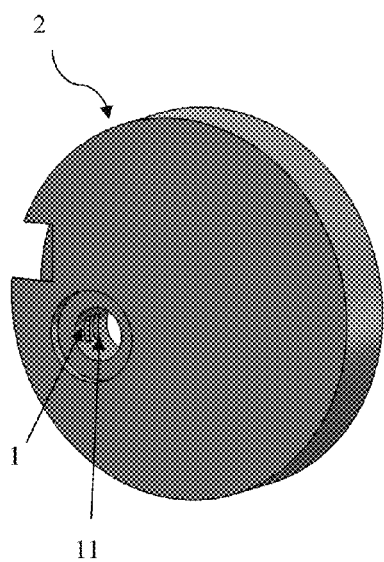
FIGS. 5A-5C illustrate a ferrule interface plate having a circular, cylindrical structure, with two spring elements disposed therein for coupling with a ferrule connector according to an embodiment of the present invention.
Figure 5B:
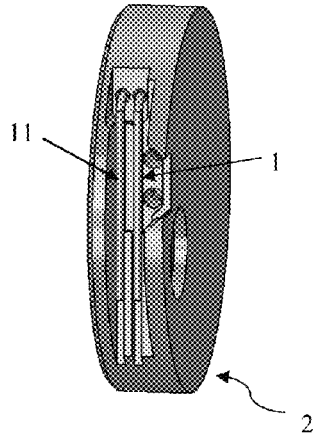
Figure 5C:
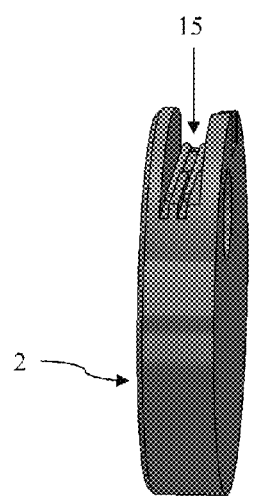

In addition, the spring cover 9 and spring element 1 are configured and arranged within the pocket relative to the ferrule port 10 and the inserted ferrule connector 3 in such a way that force applied to the ferrule connector 3 by the spring element 1 is adjustable by repositioning the spring cover 9. In particular, as shown in FIG. 2B, the spring cover 9 is shaped such that a bottom portion includes a spring element engaging portion 20 that extends below (when viewing the system from the angle of FIG. 2B) the remainder of the bottom portion. In other words, the spring element engaging portion 20 is configured such that when the spring cover 9 is positioned in the pocket over the spring element 1, the spring element engaging portion 20 is the portion that is in contact with the spring element 1 and applies force to the spring element 1. The remainder of the bottom portion of the spring cover 9 does not come into contact with the spring element 1. As shown in FIG. 2B, the spring cover 9 is disposed in the pocket such that the spring element engaging portion 20 is to the right at a location distanced away from the ferrule port 10. The spring cover 9 is then slidable within the pocket 15 so as to move spring element engaging portion 20 closer to the ferrule port 10 (in this view, to the left) or further away from the ferrule port 10 (in this view, to the right). This positioning of the spring cover 9 and the spring element engaging portion 20 relative to the ferrule port 10 is also shown in FIG. 4A. As shown, positioning the spring cover 9 such that the spring element engaging portion 20 is closer to the ferrule port 10 (in this view, to the left), as shown in FIG. 4A, increases the force applied to the spring element 1 near the ferrule port 10. This, in turn, increases the force applied by the spring element 1 to the ferrule connector 3 within the ferrule port 10. On the other hand, positioning the spring cover 9 such that the spring element engaging portion 20 is further away from the ferrule port 10 (in this view, to the right), as shown in FIG. 4B, decreases the force applied to the spring element 1 near the ferrule port. This, in turn, decreases the force applied by the spring element 1 to the ferrule connector 3 within the ferrule port 10. As such, the arrangement of the elongate spring element 1 within the pocket 15 so as to protrude along its length in the ferrule port 10 provides an adjustable cantilever when engaged by the spring cover 9. This arrangement allows for quick tuning of the insertion/removal force of the ferrule connector 3 to any desired specific requirement by simply adjusting the spring cover 9 position.

As shown in FIGS. 4A-4B, the spring cover 9 can be disposed within the pocket 15 and held in a slidable arrangement using one or more screw elements 26 which allow for the sliding arrangement. However, any other conventional fastening means or adhesive can alternatively be used to provide the sliding arrangement.

Figure 3A:
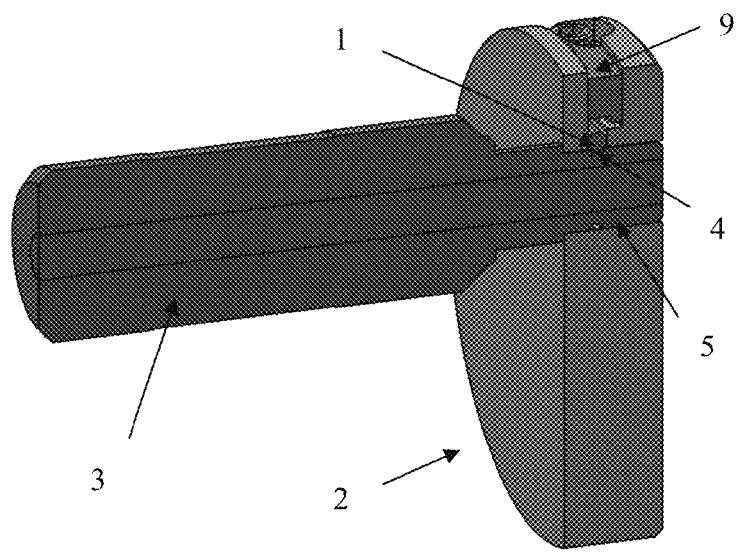
FIGS. 3A-3B show cross sectional views of the ferrule connector inserted within the ferrule port of the ferrule interface plate of FIGS. 1A-1C according to an embodiment of the present invention.
Figure 3B:
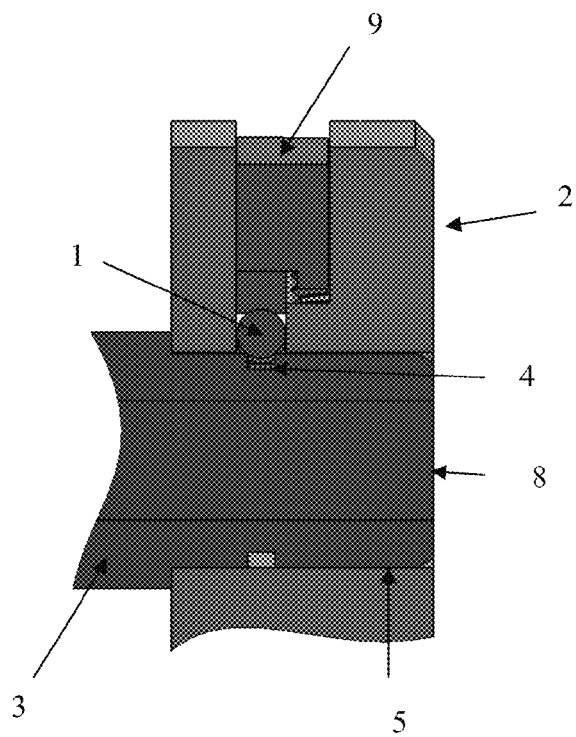

According to some embodiments, the diameter size of the spring element 1 is larger than a width of the groove 4 on the ferrule connector 3, which allows for secure fixing of the ferrule connector 3 along its insertion/removal axis and controls the position of the end 8 of the ferrule connector 3 so as to be held in a precise desired location, see FIG. 3A-B. According to other embodiments, a width of the groove 4 on the ferrule connector 3 can be very small relative to the diameter size of the spring element 1 or the ferrule connector 3 may not include a groove at all 4. As used herein, a "very small" groove 4 relative to the diameter size of the spring element 1 is generally a size at which a single spring element 1 may not apply adequate force to a ferrule connector 3 to hold the ferrule connector 3 within the ferrule port 10 as needed, resulting in the use of one or more additional spring elements. According to some embodiments, a very small groove 4 relative to the diameter size of the spring element 1 is one that is no greater than about 60% the size of the spring element 1. It is noted that whether or not the spring element 1 can apply adequate force on the ferrule connector 3 relies upon a number of factors in addition to the size of or presence of a groove 4, such as, for example, the positioning of the spring cover 9. As such, the relative size of the groove 4 to the spring element diameter may vary taking into account these other factors.

In embodiments in which the diameter size of the spring element 1 is larger than a width of the groove 4 on the ferrule connector 3, a single spring element 1 may provide adequate spring force to hold the ferrule connector 3 within the ferrule port 10 with minimal removal force. However, one or more additional spring elements may further be included to increase the spring force. In embodiments in which no groove 4 is provided or in which a width of the groove 4 on the ferrule connector 3 is very small, a single spring element 1 may provide adequate spring force to hold the ferrule connector 3 within the ferrule port 10 with minimal removal force. However, in such cases, it may challenging to provide enough spring force and, thus, one or more additional spring elements may be provided to apply additional spring force. When multiple spring elements are used together, the multiple spring elements are preferably arranged parallel to each other, or approximately parallel to each other. However, such a parallel or approximately parallel arrangement is not necessary provided that the multiple spring elements would all be arranged relative to each other such that they are fittable within the pocket 15, such that each of the multiple spring elements can engage the ferrule connector 3 when inserted in the ferrule port 10, and such that the multiple spring elements contribute to holding the ferrule connector 3 within the ferrule port 10 with adequate force. Thus, according to some embodiments, multiple spring elements could be arranged within the pocket 15 parallel to each other or at an angle relative to each other up to about 80°.

Figure 6A:
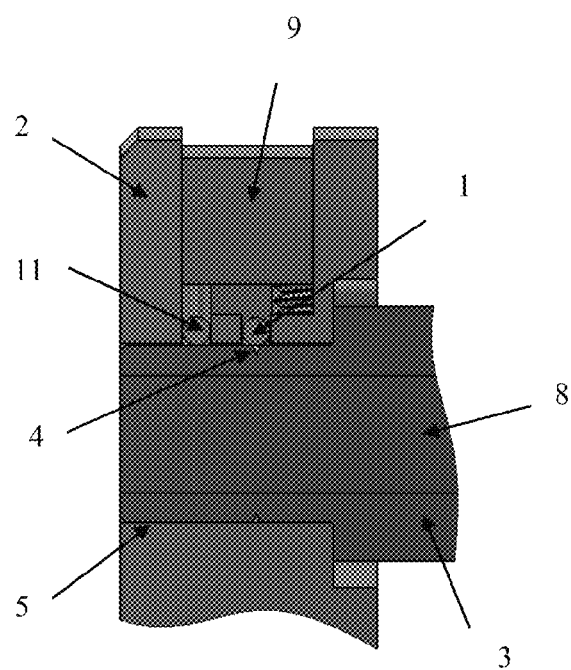
FIGS. 6A-6B show cross sectional views of the ferrule connector inserted within the ferrule port of the ferrule interface plate of FIGS. 5A-5C according to an embodiment of the present invention.
Figure 6B:
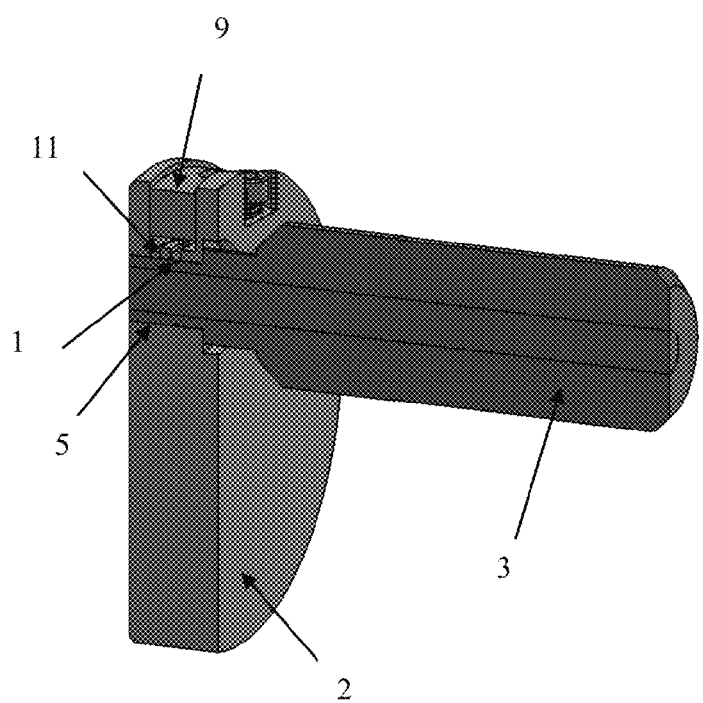

For example, as shown in FIGS. 5A-6B, a second spring element 11 is provided in addition to spring element 1. As shown in FIGS. 6A-B, where the groove 4 in the ferrule connector 3 is very small, and the second spring 11 can be used to apply additional force to the fiber ferrule 3. For example, as shown in FIG. 6A, the first spring 1 can be configured and arranged to engage with the groove 4 on the ferrule connector 3 to position the end of the fiber 8 at a precise location, while the second spring 11 can be configured and arranged to engage with the outside surface of the ferrule connector 3 to provide additional removal force. It is noted that while the second spring 11 is depicted in a location left of the groove and first spring element 1, the second spring is not limited as such, and could be positioned on the other side of the first spring element 1. Similarly, in embodiments in which no groove 4 is provided in the ferrule connector 3, both the first and second spring elements 1, 11 can engage with the outer surface of the ferrule connector 3. It is further possible to provide more than two spring elements 1, 11, if additional spring force is needed. Any additional springs could be positioned in any configuration parallel to the two spring elements 1, 11 (e.g., to the left or right of spring elements 1, 11 or in between spring elements 1, 11, etc.)

In the embodiments providing a plurality of spring elements (e.g., spring elements 1, 11, as well as any additional spring elements, if desired), the spring cover 9 and spring elements 1, 11 can be configured and arranged within the pocket relative to the ferrule port 10 and the inserted ferrule connector 3 in such a way that force applied to the ferrule connector 3 by the spring elements 1, 11 is adjustable by repositioning the spring cover 9 closer to or further away from the fiber port 10 (e.g., such as that described above in connection with FIGS. 4A-B).

It is noted that the positioning of the spring element(s) 1, 11 within the pocket 15 and within the spring cover 9 need not be centered. In other words, if a single spring element 1 is used, the single spring element 1 need not be positioned in the center of the pocket and spring cover 9. Likewise, the use of two or more spring elements 1, 11 need not be centered based on two spring elements. As such, the pocket 15 and the spring cover 9 could be provided with, for example, two spring indentations or cutout portions therein corresponding to the location of two spring elements 1, 11. This spring cover/ferrule interface plate assembly with the two indentations/cutouts, could then be used with either a single spring element 1 or with two spring elements 1, 11 interchangeably, rather than requiring individual spring covers and ferrule interface plates specifically designed for a specific number of spring elements.

According to a further embodiment, as shown in FIGS. 7A-9B, a floating spring element 12, rather than the cantilevered spring element 1, is provided. The main difference between the floating spring element 12 and the cantilevered spring element 1 is best seen when viewing FIGS. 4A-B vs. FIGS. 9A-B. As shown, in the cantilevered spring element 1 embodiment, the single spring element engaging portion 20 is provided at one side of the spring element 1 to apply force to that portion of the spring element 1 causing the spring element 1 portion positioned near the ferrule port 10 to apply force to the ferrule connector 3. With the floating spring element 12 embodiment, a spring holder 13 is configured with opposing spring element engaging portions 22 provided on opposite sides of the floating spring element 12. In particular, the force is applied to sides of the floating spring element 12 straddling the portion positioned near the ferrule port 10. A recess 24 is disposed in the spring holder 13 between the opposing spring element engaging portions 22 corresponding to a portion of the floating spring element 12 positioned near the ferrule port 10.

Figure 8A:
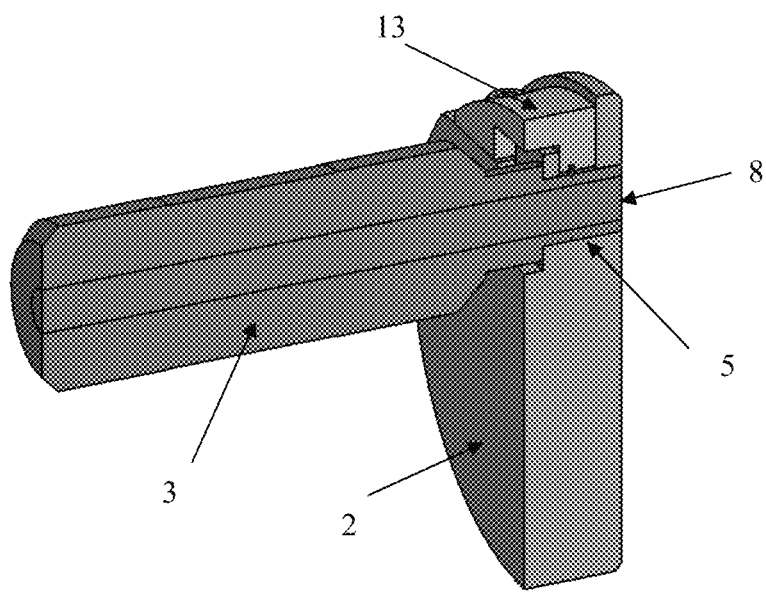
FIGS. 8A-8B show cross sectional views of the ferrule connector inserted within the ferrule port of the ferrule interface plate of FIGS. 7A-7B according to an embodiment of the present invention.
Figure 8B:
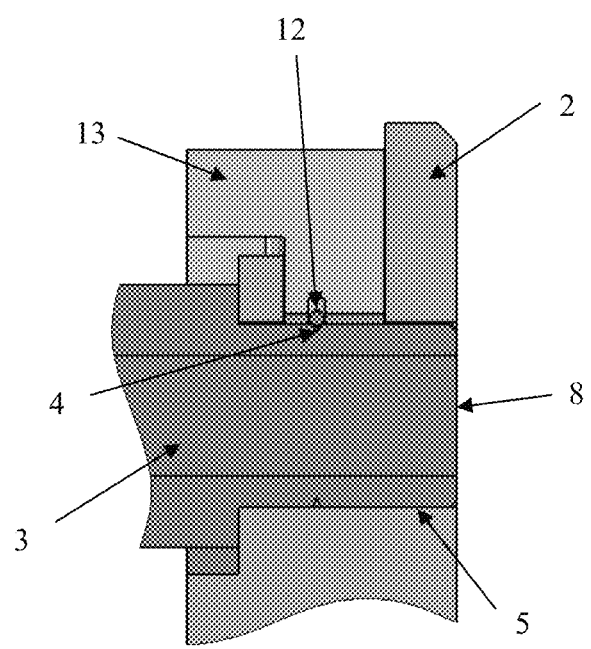
Figure 9A:
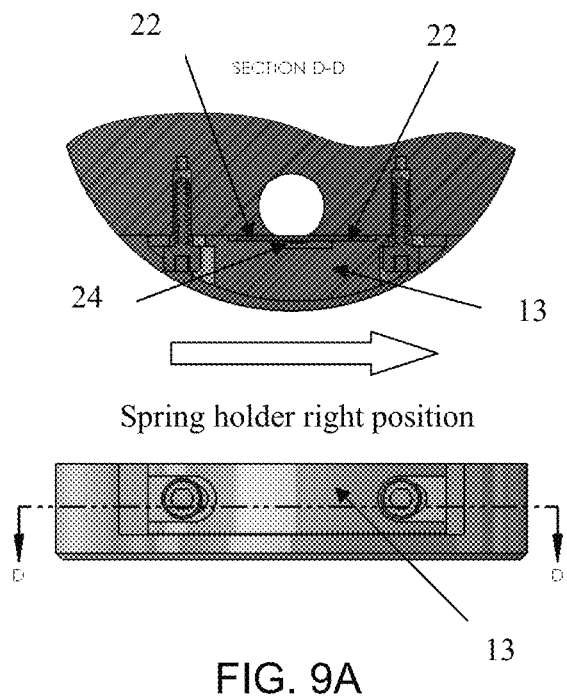
FIGS. 9A-9B illustrate how the floating spring can apply varying degrees of force to the ferrule connector by varying the positioning of the spring cover according to an embodiment of the present invention.
Figure 9B:
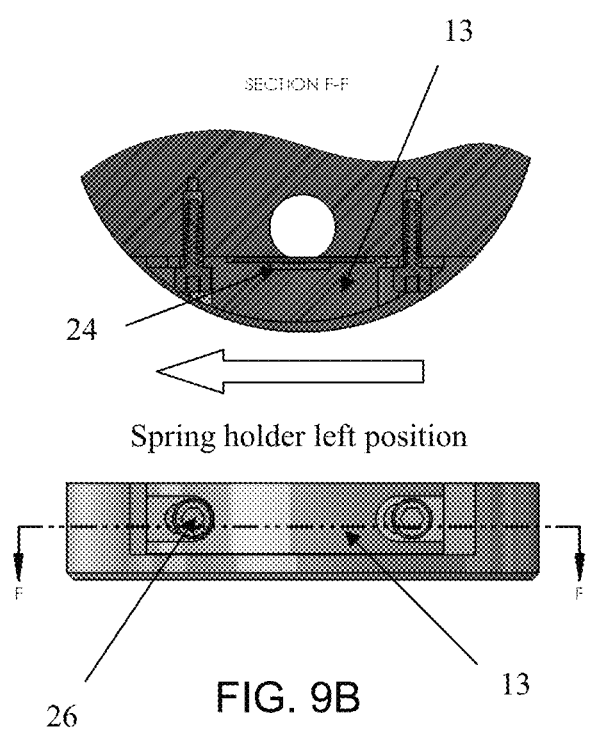

As depicted in FIGS. 8A-B, the ferrule connector 3 is then inserted into the ferrule port 10 of the ferrule interface plate 2. As the ferrule connector 3 passes through the ferrule port 10, it pushes the floating spring element 12 out of the way (i.e., out of the ferrule port 10 and back into the recess 24). Once the groove 4 on the ferrule connector 3 reaches the floating spring element 12, the spring element 12 engages with the groove 4 of the ferrule connector to secure the ferrule connector 3 within the ferrule port 10, particularly by forcing the ferrule connector 3 against the opposing side 5 of the ferrule port 10 (the opposing side 5 of the ferrule port 10 being the side opposite to the engaging floating spring element 12).

As set forth in the above embodiments, the diameter size of the floating spring element 12 is preferably larger than the width of the groove 4 so that the ferrule connector 3 can be fixed along its insertion/removal axis and so as to control the position of the end 8 of the fiber ferrule (e.g., see FIGS. 8A-B).

Figure 7A:
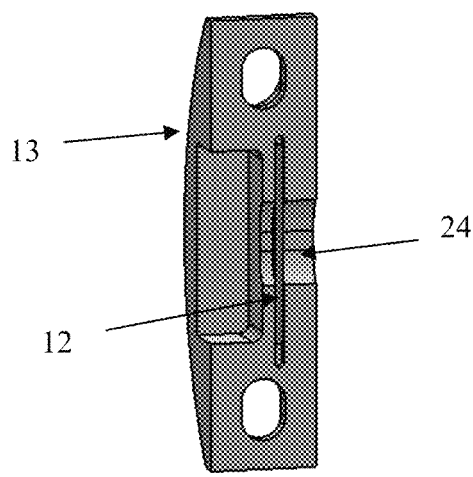
FIGS. 7A-7B illustrate a spring cover and ferrule interface plate in which a floating spring element is disposed within the spring cover for coupling with a ferrule connector according to an embodiment of the present invention.
Figure 7B:
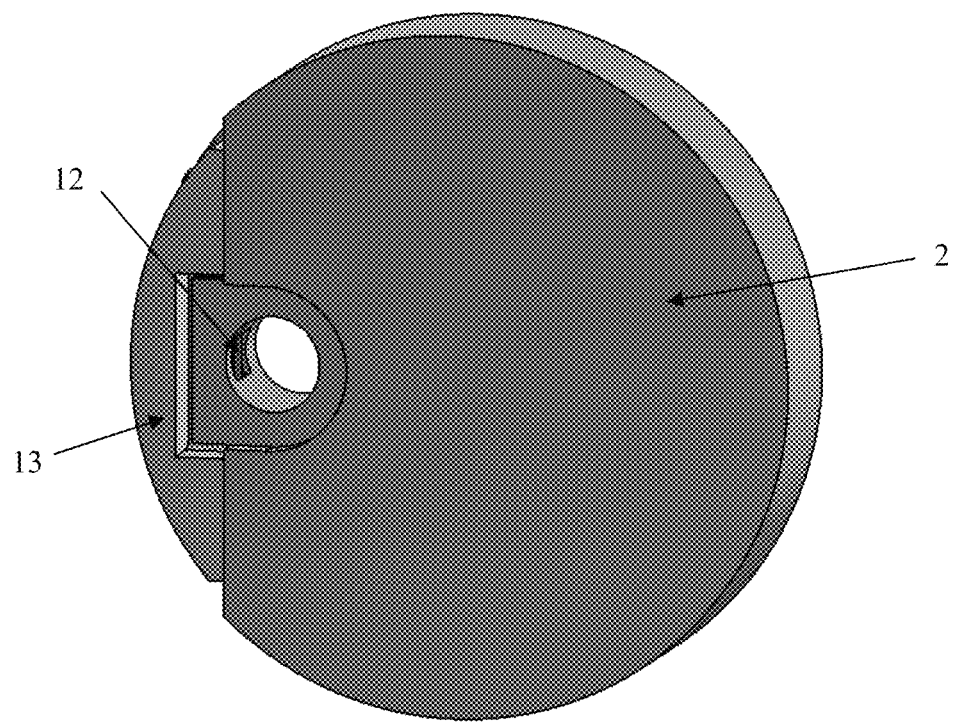

According to an embodiment, for example, as shown in FIG. 7A, the floating spring element 12 may first be assembled in a pocket of a spring holder 13. The spring holder 13 can then be positioned in an opening in the side of the ferrule interface plate 2 (e.g., in a pocket) so as to engage a ferrule connector 3 when it is inserted within the ferrule port 10. Alternatively, the floating spring element 12 may first be positioned within the pocket 15 and then the spring holder may subsequently be positioned so as to engage the spring element(s) 12.

Similar to the cantilevered spring element embodiments, the force applied by the floating spring element 12 to the ferrule connector 3 can be adjusted by repositioning the spring holder 13. In particular, positioning the spring holder 13 such that a spring element engaging portion 22 lines up with a portion of the spring element 12 that engages the ferrule connector (here, positioning to the right FIG. 9A) increases the force applied to the ferrule connector 3. On the other hand, positioning the spring holder 13 such that the recess 24 lines up with a portion of the spring element 12 that engages the ferrule connector (here, positioning to the left FIG. 9B) decreases the force applied to the ferrule connector 3. Thus, as with the cantilevered spring embodiment, the arrangement of the spring element 12 so as to protrude along its length in the ferrule port 10 in a position relative to one or more movable spring element engagement portions 22 provides for quick tuning of the insertion/removal force to a specific requirement.

Figure 10A:
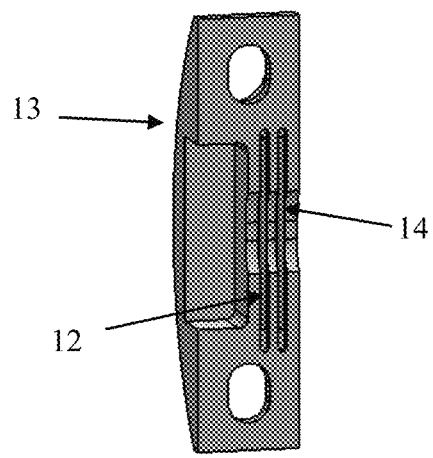
FIGS. 10A-10B illustrate a spring cover and ferrule interface plate in which a floating spring and a second spring are disposed within the spring cover for coupling with a ferrule connector according to an embodiment of the present invention.
Figure 10B:
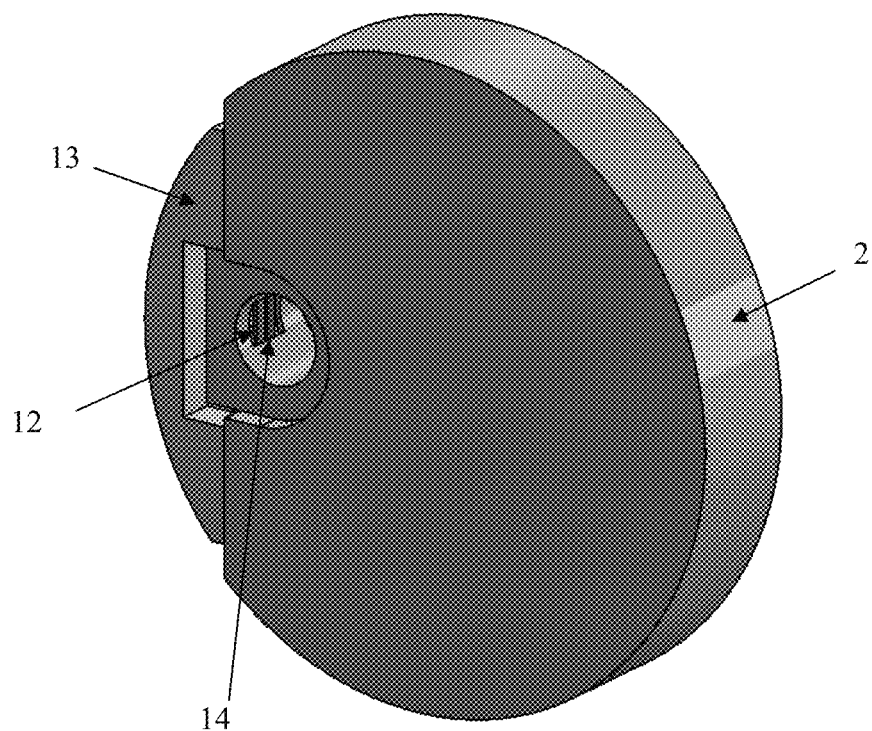

As with the cantilevered spring element embodiment, in some embodiments, one or more additional spring elements may be included in addition to the floating spring element 12. Such additional spring element(s) can be used in embodiments in which the ferrule connector 3 has a groove 4 that is very small, resulting in insufficient spring force to hold the ferrule connector 3 with a minimum removal force, in embodiments in which the ferrule connector 3 does not include a groove 4, or even in embodiments where the ferrule connector 3 has a groove 4 that is not particularly small in width. For example, as depicted in FIGS. 10A-B, second spring 14 can be used to apply additional force to the ferrule connector 3.

Figure 11A:
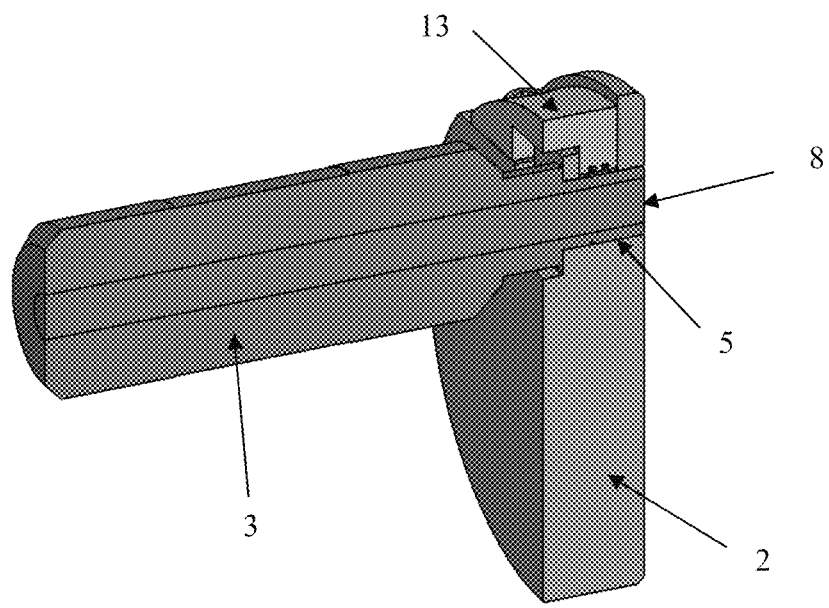
FIGS. 11A-11B show cross sectional views of the ferrule connector inserted within the ferrule port of the ferrule interface plate of FIGS. 10A-10B according to an embodiment of the present invention.
Figure 11B:
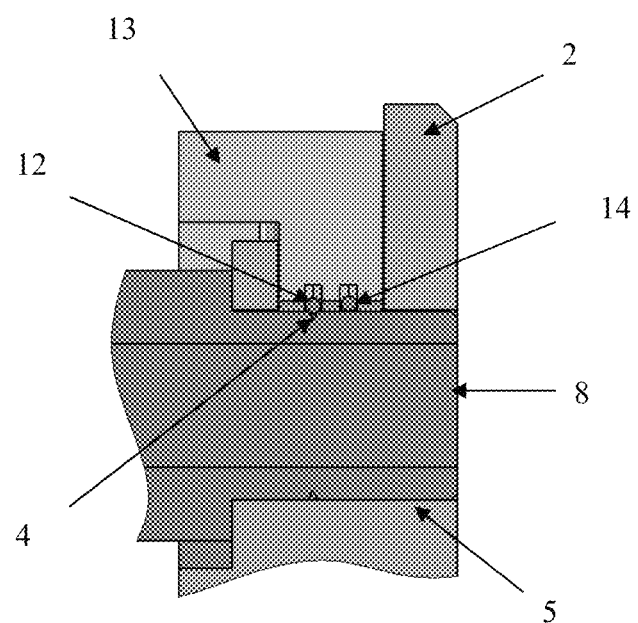

As shown in FIGS. 11A-B, the floating spring element 12 is configured and arranged to engage with the groove 4 on the ferrule connector 3 so as to position the end 8 of the ferrule connector 3 at a desired location. The second spring 14 is configured and arranged to engage an outside surface of the ferrule connector 3 to provide additional removal force as desired. As with the other embodiments, it is further possible to provide more than two spring elements 12, 14. It is noted that while the second spring 14 is depicted in a location left of the groove 4 and floating spring element 12, the second spring 14 is not limited as such, and could be positioned on the other side of the floating spring element 12.

In the embodiments providing a plurality of spring elements (e.g., spring elements 12, 14, as well as any additional spring elements, if desired), the spring holder 13 and spring elements 12, 14 can be configured and arranged relative to the ferrule port 10 and the inserted ferrule connector 3 in such a way that force applied to the ferrule connector 3 by the spring elements 12, 14 is adjustable. In particular, the force applied is adjustable by repositioning the spring holder 13 so as change the position of the spring element engagement portions 22 relative to the portion of the spring elements 12, 14 that engage the ferrule connector 3 in the same way as described above with a single floating spring element 12.

As in the cantilevered spring element embodiment described above, is noted that the positioning of the multiple spring element(s) 12, 14 within the spring holder 13 and within the opening in the ferrule interface plate 2 need not be centered. As such, spring indentations/cutouts in the opening in the ferrule interface plate 2 and in the spring holder 13 could be provided with, for example, two spring indentations/cutout portions therein corresponding to the location of two spring elements 12, 14. This spring holder/ferrule interface plate assembly with the two indentations/cutouts, could then be used with either a single spring element 12 or with two spring elements 12, 14 interchangeably, rather than requiring individual spring covers and ferrule interface plates specifically designed for a specific number of spring elements.

While FIGS. 1A-11B depict ferrule interface plates with a single ferrule port 10, multiple ferrule ports could also be provided, if desired. Generally, the multiple ferrule ports would be positioned and arranged in the ferrule interface plate so as to be positionable on or within the illumination device for proper alignment for use, depending on which one of the multiple ferrule ports is being used at any given time. For example, in an incrementally rotatable ferrule interface plate (possibly used together with a turret system), it would be desirable for the ferrule interface plate to be mounted at a central point, with all of the multiple ferrule ports disposed at equal distances from the central point.

FIGS. 12A-C and 13 show an example of a ferrule interface plate 19 which has a generally oval shape. In this embodiment, a single ferrule port is provided with a single spring element 1. The general features and options as discussed above in connection with the cantilevered spring element configuration and the floating spring element configuration would be applicable in this configuration as well and, as such, will not be repeated here in detail. This embodiment could also be provided in a rotating arrangement with, for example, a second ferrule port (not shown) positioned opposite the ferrule port 10, equidistant from a central connection point. Such an arrangement could allow for incremental rotation between the two ferrule ports.

According to all of the embodiments described above, the various materials used in forming the components can be in accordance with conventional ferrule connectors and interface plates. Some possible materials include various metals and plastics.

According to the present configuration, one or more spring elements (e.g., spring elements 1, 11, 12, 14) are disposed in a ferrule interface plate 2 adjacent to a ferrule port 10 in such a manner that when any size or shape ferrule connector is inserted in the ferrule port 10, the one or more spring elements securely engage the outer surface of the ferrule connector (with or without an outer groove 4), particularly by pushing the ferrule connector against an opposing surface of the ferrule port. Further, the one or more spring elements are disposed in a ferrule interface plate adjacent to a ferrule port, and are engaged by a movable spring cover/spring holder in such a way that the force applied by the one or more spring elements can be easily adjusted as needed.

The present invention beneficially provides a ferrule connector that fixes a fiber optic ferrule tightly in the insertion/removal axis of a ferrule port, without allowing back and forth motion, while positioning the end of the ferrule connector at a precise location. In addition, the ferrule connector prevents rotation of the fiber optic ferrule side to side (horizontally) and up and down (vertically) after insertion. Still further, the ferrule connector of the present invention is configured to allow for quick tune-ability of the insertion/removal forces of the fiber optic ferrule.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fiber optic ferrule coupling system comprising:
    a ferrule interface plate having opposing faces and a side surface connecting the opposing faces;
    a ferrule port extending through a thickness of the ferrule interface plate between the opposing faces;
    a pocket disposed along the side surface and extending adjacent the ferrule port;
    an elongate spring element disposed in the pocket, the elongate spring element having a longitudinal axis, the longitudinal axis extending in a direction approximately tangent to the ferrule port, the elongate spring element having a ferrule engaging portion along a length thereof protruding into the ferrule port for engaging a ferrule connector inserted in the ferrule port; and
    a spring cover adjustably received in the pocket, the spring cover having a spring engaging side, the spring engaging side having a recess and a spring element engaging portion, the spring element engaging portion engaging a portion of the elongate spring element, wherein the spring cover is adjustably received in the pocket so as to be movable in a direction substantially parallel to the longitudinal axis of the elongate spring element to thereby change the location of the spring element engaging portion relative to the ferrule engaging portion of the elongate spring, element.

2. The fiber optic ferrule coupling system of claim 1, wherein the spring element engaging portion applies a force to the elongate spring element, which applies a force to a ferrule connector inserted in the ferrule port.

3. The fiber optic ferrule coupling system of claim 2, wherein changing the location of the spring element engaging portion relative to the ferrule engaging portion of the elongate spring element adjusts the force applied by the ferrule engaging portion to a ferrule connector inserted in the ferrule port.

4. The fiber optic ferrule coupling system of claim 3, wherein positioning the spring element engaging portion closer to the ferrule engaging portion of the elongate spring element increases the force applied to the ferrule connector inserted in the ferrule port, and positioning the spring element engaging portion further away from the ferrule engaging portion of the elongate spring element decreases the force applied to the ferrule connector inserted in the ferrule port.

5. The fiber optic ferrule coupling system of claim 1, Wherein the ferrule interface plate is cylindrical with opposing circular faces and a curved surface connecting the opposing circular faces.

6. The fiber optic ferrule coupling system of claim 1, wherein the ferrule connector includes a groove in an outer surface, and wherein the spring element engages the groove of the ferrule connector by at least partially dropping into the groove.

7. The fiber optic ferrule coupling system of claim 6, wherein a diameter of the spring element is larger than a width of the groove.

8. The fiber optic ferrule coupling system of claim 1, wherein the spring element is a cantilevered spring.

9. The fiber optic ferrule coupling system of claim 1, wherein the spring element is a floating spring.

10. The fiber optic ferrule coupling system of claim 9, wherein the spring cover engaging side has a recess disposed between two spring element engaging portions.

11. The fiber optic coupling system of claim 1, wherein the spring element has a generally elongate linear shape, a generally elongate L-shape, a generally elongate J-shape, a generally elongate U-shape, or a generally elongate linear shape with one or more curves.

12. The fiber optic coupling system of claim 1, further comprising one or more additional elongate spring elements disposed in the pocket parallel to the spring element.

13. The fiber optic coupling system of claim 1, wherein the ferrule port has an inner generally circular surface, wherein the ferrule engaging portion of the elongate spring element engages a ferrule connector inserted in the ferrule port and pushes the ferrule connector against an opposing side of the inner generally circular surface to secure the ferrule connector.

14. A fiber optic ferrule coupling system comprising:
a ferrule interface plate having opposing Dices and a side surface connecting the opposing faces;
a ferrule port extending through a thickness of the ferrule interface plate between the opposing faces;
a pocket disposed along the side surface and extending adjacent the ferrule port;
an elongate spring element disposed in the pocket in a position approximately parallel to a line tangent the ferrule port, the elongate spring element having a ferrule engaging portion along a length thereof protruding into the ferrule port for engaging a ferrule connector inserted in the ferrule port; and
a spring cover adjustably received in the pocket, the spring cover having a spring engaging side, the spring cover engaging side having a recess disposed between two spring element engaging portions, the spring element engaging portions engaging a portion of the elongate spring element, wherein the spring cover is adjustably received in the pocket so as to change the location of the recess relative to the ferrule engaging portion of the elongate spring element.

15. The fiber optic ferrule coupling system of claim 14, wherein the spring element engaging portions each apply a force to the elongate spring element, which applies a force to a ferrule connector inserted in the ferrule port.

16. The fiber optic ferrule coupling system of claim 15, wherein changing the location of the recess and the locations of the spring element engaging portions relative to the ferrule engaging portion of the elongate spring element adjusts the force applied by the ferrule engaging portion to a ferrule connector inserted in the ferrule port.

17. The fiber optic ferrule coupling system of claim 16, wherein positioning the spring element engaging portions closer to the ferrule engaging portion of the elongate spring element increases the force applied to the ferrule connector inserted in the ferrule port, and positioning the spring element engaging portion farther away from the ferrule engaging portion of the elongate spring element decreases the force applied to the ferrule connector inserted in the ferrule port.

18. The fiber optic ferrule coupling system of claim 14, wherein the ferrule connector includes a groove in an outer surface, and wherein the spring element engages the groove of the ferrule connector by at least partially dropping into the groove.

19. The fiber optic ferrule coupling system of claim 18, wherein a diameter of the spring element is larger than a width of the groove.

20. The fiber optic ferrule coupling system of claim 14, wherein the spring element has a generally elongate linear shape, a generally elongate L-shape, a generally elongate J-shape, a generally elongate U-shape, or a generally elongate linear shape with one or more curves.

21. A fiber optic ferrule coupling system comprising:
a ferrule interface plate having opposing faces and a side surface connecting the opposing faces;
a ferrule port extending through a thickness of the ferrule interface plate between the opposing faces;
a pocket disposed along the side surface and extending adjacent the ferrule port;
an elongate spring element disposed in the pocket in a position approximately parallel to a line tangent the ferrule port, a portion of the elongate spring element protruding into the ferrule port for engaging a ferrule connector inserted in the ferrule port, the portion being disposed between opposing ends of the elongate spring element; and
a spring cover adjustably received in the pocket, the spring cover having a spring engaging side, the spring engaging side having a recess and a spring element engaging portion, the spring element engaging portion engaging the elongate spring element, wherein the spring cover is adjustably received in the pocket so as to change the location of the spring element engaging portion relative to the protruding portion of the elongate spring element.

22. The fiber optic coupling system of claim 21, wherein the spring element engaging portion applies a force to the elongate spring element, which applies a force to a ferrule connector inserted in the ferrule port.

23. The fiber optic ferrule coupling system of claim 22, wherein changing the location of the spring element engaging portion relative to the protruding portion of the elongate spring element adjusts the force applied by the protruding portion of the elongate spring element to a ferrule connector inserted in the ferrule port.

24. The fiber optic ferrule coupling system of claim 23, wherein positioning the spring element engaging portion closer to the protruding portion of the elongate spring element increases the force applied to the ferrule connector inserted in the ferrule port, and positioning the spring element engaging portion further away from the protruding portion of the elongate spring element decreases the force applied to the ferrule connector inserted in the ferrule port.

25. The fiber optic ferrule coupling system of claim 21, wherein the ferrule connector includes a groove in an outer surface, and wherein the spring element engages the groove of the ferrule connector by at least partially dropping into the groove.

26. The fiber optic ferrule coupling system of claim 25, Wherein a diameter of the spring element is larger than a width of the groove.

27. The fiber optic coupling system of claim 21, wherein the spring element has a generally elongate linear shape, a generally elongate L-shape, a generally elongate J-shape, a generally elongate U-shape, or a generally elongate linear shape with one or more curves.

28. A fiber optic ferrule coupling system comprising:
a ferrule interface plate having opposing faces and a side surface connecting the opposing faces;
a ferrule port extending through a thickness of the ferrule interface plate between the opposing faces;
a pocket disposed along the side surface and extending adjacent the ferrule port;
a first elongate spring element disposed in the pocket in a position approximately parallel to a line tangent the ferrule port, the first elongate spring element having a ferrule engaging portion along a length thereof protruding into the ferrule port for engaging a ferrule connector inserted in the ferrule port;
one or more additional elongate spring elements disposed in the pocket parallel to the first elongate spring element; and
a spring cover adjustably received in the pocket, the spring cover having a spring engaging side, the spring cover engaging side having a recess and a spring element engaging portion, the spring element engaging portion engaging a portion of the elongate spring elements, wherein the spring cover is adjustably received in the pocket so as to change the location of the spring element engaging portion relative to the ferrule engaging portion of the elongate spring element.

* * * * *